April 7, 1964     C. S. VOELCKER     3,127,845
PUMP DESIGN
Filed Oct. 3, 1960
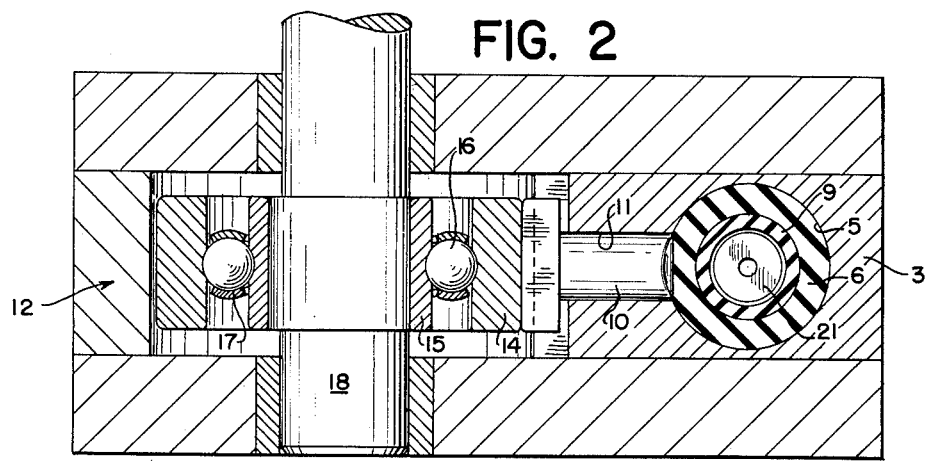
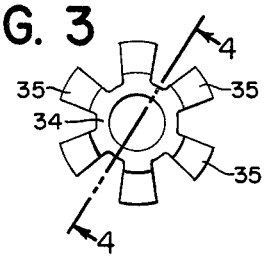
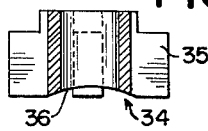
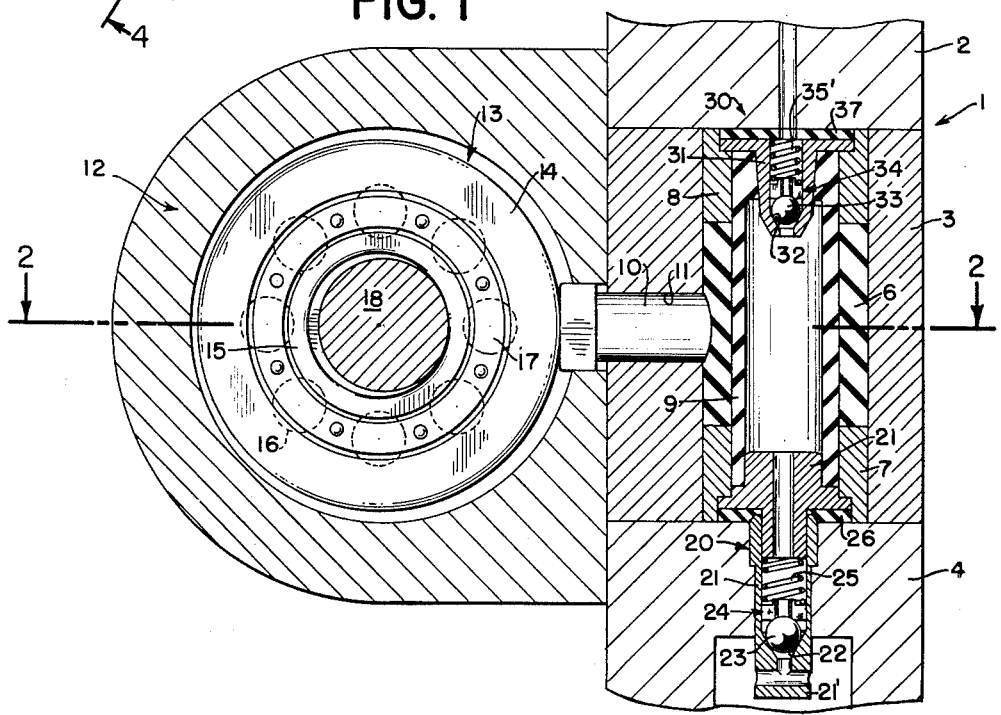
INVENTOR
CARL S. VOELCKER
BY
ATTORNEYS

United States Patent Office 3,127,845
Patented Apr. 7, 1964

3,127,845
PUMP DESIGN
Carl S. Voelcker, 52 Duck Pond Road, Glen Cove, N.Y.
Filed Oct. 3, 1960, Ser. No. 59,940
5 Claims. (Cl. 103—148)

This invention relates to a pump design and more particularly to a high-pressure metering pump which will accurately meter fluid having corrosive or volatile properties.

A problem existing in the accurate metering or pumping of corrosive and volatile fluid is that the fluid will often attack the several parts making up the pump assembly causing them to corrode or pit. Another problem existing in high-pressure metering pumps is that of accurately metering a predetermined amount of fluid under definite pressure conditions caused by the pump operating at various speeds.

Still another problem existing in metering pumps having inlet and outlet ball check valves at the inlet and outlet openings of a pumping chamber is to prevent bounce of the balls on the ball seats and spinning of the balls which in turn will effect the time in which the ball is off the seat and, therefore, the amount of fluid which enters and leaves the pumping chamber. This is particularly true in high-speed metering pumps where the ball checks are rapidly moving off and on their seats.

Broadly, I propose to overcome the aforementioned difficulties by utilizing a pumping chamber which comprises in part a flexible tubular element made of an incompressible elastomer having flowable characteristics such as disclosed in my copending application Serial No. 732,048, filed April 30, 1958, now Patent No. 2,963,014, and entitled Fuel Injector Pump and System. In that application, I disclose the desirability of using in a fuel injector pump a tubular element which is made of an incompressible elastomer having flowable characteristics and which is completely enclosed by a pump housing, inlet and outlet check valves mounted in each end of the tubular element, and a plunger which engages a portion of the tubular element through a hole in the housing. As pointed out in that application, as the plunger is pressed into the tubular element, the material of the element will be caused to flow around the edges of the plunger so that the displacement by the plunger into the tubular element must be compensated for by an equal displacement of fuel from the interior of the tubular element.

My present invention utilizes a different tubular construction than that shown in my previous application in order that the pump may be used in a wider variety of applications. Further, my present invention utilizes a novel inlet and outlet valve system for the pump which insures accurate metering when the pump is operating at high speeds and pressures.

My novel pump comprises generally a first tubular element made of an incompressible elastomer surrounded in part by a second tubular element also made of an incompressible elastomer. The first tubular element has in its ends thereof an inlet and outlet ball check valve assembly and all of the parts are mounted in a pump housing through which a reciprocally movable plunger may contact the outer periphery of the second tubular element. In addition, plunger moving means are provided and the parts are so arranged that the first tubular element is completely enclosed by the inlet and outlet ball check assembly, the second tubular element, the housing, and the plunger.

Referring to the drawings in which a preferred embodiment of my invention is illustrated, FIG. 1 is a side sectional view of a pump constructed according to my invention;

FIG. 2 is a sectional view of the pump shown in FIG. 1 taken along lines 2—2;

FIG. 3 is an enlarged plan view of the ball follower shown in FIG. 1; and,

FIG. 4 is a sectional view of FIG. 3 taken along lines 4—4.

Referring to the drawings in greater detail and in particular to FIG. 1, 1 denotes generally a pump housing comprising parts 2, 3, and 4. Part 3 has a bore 5 therein as shown in FIG. 2 and in which fits a second tubular element 6 made of an incompressible elastomer having flowable characteristics. Inserts 7 and 8 are also positioned in the bore so as to securely fix the tubular element 6 therein.

A first tubular element 9, also made of an incompressible elastomer having flowable characteristics, is positioned inside of the tubular element 6 and of the inserts 7 and 8.

A reciprocally movable plunger 10 passes through a bore 11 of the part 3 and engages the outside periphery of the second tubular element 6. Plunger 10 is moved by plunger moving means denoted generally by 12 which in turn comprises an antifriction bearing assembly denoted generally by 13 having an outer race 14 and an inner race 15, separated by balls 16 which are positioned by means of a ball cage 17. The inner race 15 of the ball-bearing assembly 13 is mounted eccentrically on shaft 18 which in turn may be rotated by means not shown.

The use of the two separate tubular elements with one surrounding the other results in a number of advantages. An important advantage is that the plunger may cut into the outside tube without cutting into the inside tube. This results in the cutout of the outside tube being pushed ahead of the plunger, and because the tube is made of an elastomer having flowable properties, will spread the force being exerted on the inside tube. In addition, there will be less overall swelling of the tubes where fluids are pumped that may react with the elastomer comprising the tubes, since only the inside tube will be in contact with the fluid. This is particularly true where the outer tube has a greater wall thickness than the inner tube as shown in the drawings and is shorter than the inner tube.

Still a further advantage of utilizing two tubes is that there will be a more rapid return stroke of the plunger when not forced into the outer tube by the device means than when a single thin tube is used. This is because the resilient force of a thick wall tube to return to normal shape after being deformed is greater than that of a thin wall tube. While the outer tube is not as long as the inner tube, the area beneath the plunger or the relatively thick wall of the two tubes is that which determines the reactive force. The reactive force tending to return the tubes to normal shape and thus the speed of return is an important factor in high-speed pumping.

An inlet valve assembly denoted generally by 20 is positioned at one end of the tubular element 9. Inlet valve assembly 20 in turn comprises a ball check housing 21 having a tapered valve seat 22 in which a ball check 23 may move and a housing extension 21'. Ball check 23 in turn is guided in the housing by means of a ball follower 24 which is urged downward as shown in FIG. 1 by means of a spring 25 to force or urge the ball into contact with the seat 22. A seal 26 insures a fluid-type seal between the ball check housing and the part 4.

An outlet valve assembly denoted generally by 30 is positioned at the other end of tubular element 9. Outlet valve assembly 30 in turn comprises a ball check housing 31 having a tapered seat 32 into which a ball check 33 seats. Ball check 33 is guided in housing 31 by means of a ball follower 34 which is urged in a downward direction as shown in FIG. 2 by means of a spring 35'. Housing 31 is sealed with respect to the part 2 of the housing by means of a seal 37.

The ball followers 24 and 34 serve as a ball centering means in order to insure that the balls will seat in the center of the tapered seats and so help prevent the balls from spinning. This is because when the balls are off center, fluid flow around the balls will be uneven so causing the balls to spin. Spinning itself is an undesirable characteristic since it allows a small metering error as fluid flow will be faster around the balls in the direction of spin. The ball follower 34 comprises a plurality of legs 35, as seen in FIGS. 3 and 4, which serve to guide the follower in the housing. The follower is spherically grooved at 36 in order to receive the ball and to center it with respect to the valve seat. In addition, it has been found that when the ball follower is made of brass, that the brass tends to seize on the ball so providing an additional ball anti-rotation means. While I have described only follower 34 in detail, the follower 24 is similar in all respects.

It has been found that when the ball is made of tungsten carbide, which is an extremely hard material, bouncing of the ball when the pump is operating at high speeds is minimized. The valve seat itself is made of a hardened tool steel which allows the use of a seat having an appreciable taper. If the valve seat had less taper or if the ball check were made of a softer material, at high speeds the ball would tend to bounce when it contacted the seat which in turn would allow passage of fuel through the open valve. Further, the follower tends to guide the ball check to insure that the ball will engage the center of the seat.

The operation of my novel pump is as follows: As the shaft 18 is rotated, the outer race 14 will force the plunger 10 into engagement with tube 6. As the plunger continues to advance into the tube, it will displace an equal volume of the side wall of the tube 6. Because both tubes 6 and 9 are made of an incompressible material and because the tubes are completely enclosed by the housing inserts, and valve assemblies 20 and 30, there is no place for the displaced material to go but towards the open space in the interior of the inner tube. This displacement of tube material will then force an equal volume of fluid out through the outlet check valve against the force of its spring. It is thus apparent that the displacement of the plunger into the housing must equal exactly the volume of liquid forced out the outlet valve. As the shaft 18 continues to turn, the plunger will be forced outwards of the housing due to the resilient force of the tubes to return to normal shape. This will cause a negative pressure to exist in the tube allowing the inlet valve to open to allow fluid to enter into the pumping chamber which is defined by the inner walls of the inner tube. After the chamber is again filled with fluid and the tubes have returned to their normal shape with the plunger out of the housing, the pump is then ready to begin another pumping cycle.

It is apparent that the amount of fluid pumped during a given period of time by the pump illustrated is dependent upon the speed of rotation of shaft 18. However, the amount could also easily be varied by regulating the length of the stroke of the plunger into the housing. Also, while two separate tubes are shown, one surrounding the other, it is also apparent that a single tube made of an incompressible elastomer could be used wherein the tube had a thicker wall section where it is contacted by the plunger than over the remainder of its length.

It has been found that a pump constructed according to that set out above may operate effectively at fluid pressure between 500 and 10,000 pounds per square inch and displace uniform volumes of liquid within .05 m.$^3$ at operating speeds between 60 and 6,000 strokes per minute of the plunger.

A pump constructed according to my invention has particular application to pumping systems requiring accurate high-pressure metering. Typical applications are: accurate blending of volatile chemicals under high-pressure conditions, charging of hydraulic accumulators, or use in differential pressure systems such as air conditioning or refrigeration.

While I have illustrated a preferred embodiment of my invention, it is to be understood that structural changes may be made in the pump shown and still come within the scope of the invention which is to be limited only by the appended claims.

I claim:

1. A high-pressure metering pump comprising a housing, a first tubular element made of an incompressible flexible elastomer, a second tubular element made of an incompressible flexible elastomer surrounding said first tubular element and contained within said housing, a reciprocally movable plunger extending through a side wall of said housing and engaging said second tubular element, plunger moving means, an inlet check valve means at one end of said housing and closing one end of said first tubular element, and an outlet check valve means at the other end of said housing enclosing the other end of said first tubular element; said housing and said plunger engaging and confining the entire outer surface of said second tubular element.

2. A high-pressure metering pump according to claim 1 wherein said inlet and said outlet valves each comprise a ball check housing having a tapered valve seat, a ball check movable in said housing to seat on said valve seat, a ball follower engaging said ball for guiding said ball in said housing, and a spring positioned between said ball follower and said housing urging said ball into contact with said seat.

3. A high-pressure metering pump according to claim 1 wherein said plunger moving means comprises a rotatable shaft, and an antifriction bearing assembly having an inner and outer race mounted eccentrically on said shaft with said outer race engaging said plunger.

4. A high-pressure metering pump comprising a housing, a tubular element made of an incompressible flexible elastomer contained within said housing, a reciprocally movable plunger extending through a side wall of said housing and engaging said tubular element, said housing and plunger engaging the entire outer wall of said tubular element, plunger moving means, an inlet check valve means at one end of said housing and closing one end of said tubular element and an outlet check valve means at the other end of said housing and closing the other end of said tubular element; each said check valve means comprising in turn a ball check housing having a tapered valve seat, a ball of a hardened material movable in said housing to seat on said valve seat, a ball follower of a softer material than said hardened material comprising said ball engaging said ball for guiding said ball in said housing, and a spring positioned between said ball follower and said housing urging said ball into contact with said seat.

5. A high-pressure metering pump according to claim 4 wherein said ball follower has a plurality of guide legs for guiding said follower in said housing and a spherically grooved portion to receive and center said ball in said seat.

References Cited in the file of this patent

UNITED STATES PATENTS

| | | |
|---|---|---|
| 247,142 | Woods | Sept. 13, 1881 |
| 1,377,583 | Human | May 10, 1921 |
| 1,965,006 | Scott | July 3, 1934 |
| 2,042,216 | Edwards | May 26, 1936 |
| 2,243,144 | Auckland | May 27, 1941 |
| 2,285,974 | Huber | June 9, 1942 |
| 2,481,713 | Bertea | Sept. 13, 1949 |
| 2,836,121 | Browne | May 27, 1958 |
| 2,912,791 | Cohen | Nov. 12, 1959 |
| 2,963,014 | Voelcker | Dec. 6, 1960 |